Figure 1:
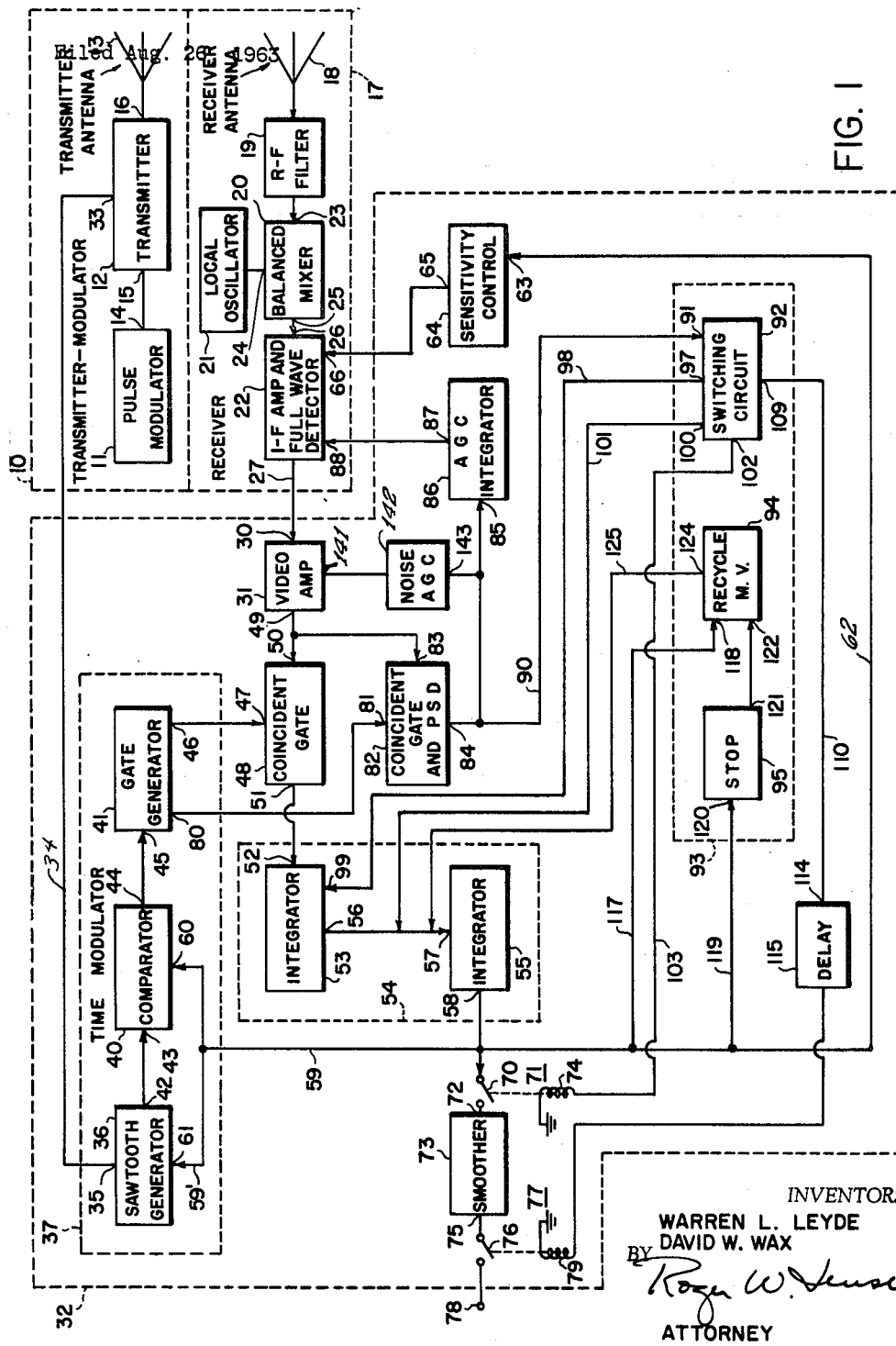

INVENTORS
WARREN L. LEYDE
DAVID W. WAX
BY Roger W. Jensen
ATTORNEY

Jan. 25, 1966 W. L. LEYDE ETAL 3,231,889
PULSE TYPE RADAR ALTIMETER
Filed Aug. 26, 1963 2 Sheets-Sheet 2

INVENTORS
WARREN L. LEYDE
DAVID W. WAX
BY
ATTORNEY

United States Patent Office 3,231,889
Patented Jan. 25, 1966

3,231,889
PULSE TYPE RADAR ALTIMETER
Warren L. Leyde and David W. Wax, Seattle, Wash.,
assignors to Honeywell Inc., a corporation of Delaware
Filed Aug. 26, 1963, Ser. No. 304,408
6 Claims. (Cl. 343—7.3)

This invention pertains to improvements in time modulator units for use in pulse radar systems and more particularly to a time modulator unit wherein the slope of a sawtooth generated voltage is varied as a function of target distance.

The present invention finds particular use in radar altimeters. One such radar altimeter comprises a transmitter section that includes a pulse modulator, a transmitter and a transmitter antenna. The pulse modulator drives the transmitter which in turn drives the transmitter antenna. The transmitter antenna radiates a pulse of RF energy toward the reflecting object, in this case, the ground. The radiated pulses from the transmitter antenna have a very short pulse width, in the range of a few nanoseconds.

The reflected ground return pulse is received by a receiver antenna and is fed through an RF filter to a balanced mixer. In the balanced mixer the ground return pulse is mixed with a signal from a local oscillator and the output of the balanced mixer is fed through an IF amplifier and full wave detector to the output of the receiver.

The transmitter antenna and the receiver antenna are mounted so as to minimize antenna leakage effects.

A timing pulse from the transmitter section is fed to the input of a time modulator. The time modulator generates a sawtooth wave having a time duration which is a function of range or altitude. The output of a double range integrator is fed to the time modulator and the magnitude of this signal is compared with the instantaneous value of the range sawtooth. When the output of the double range integrator and the instantaneous value of the range sawtooth are equal, a pulse is generated at the output of the time modulator and is fed to the first input of a first coincidence gate. The output of the double range integrator is also fed to the sawtooth generator within the time modulator and causes the slope of the sawtooth generated signal to vary as a function of the output signal from the double range integrator. The output signal from the double range integrator is directly proportional to altitude, and since this signal is controlling the slope of the sawtooth generated signal in the time modulator, this slope will vary as a function of altitude. In other words, as the altitude signal increases, the slope of the sawtooth generated signal decreases. The present invention eliminates the necessity of additional range changing circuitry in order to increase or decrease the effective range of the altimeter. With the present invention the slope of the sawtooth generated signal in the time modulator, and hence the effective range of the altimeter, is varied as a function of the altitude signal.

The output of the receiver is fed through a video amplifier to a second input of the first coincidence gate. Therefore, both the output pulses from the time modulator and the output of the video amplifier are fed to inputs of the first coincidence gate. These signals are compared in the coincidence gate and a coincidence gate output signal is developed which is proportional to the common area between the two input signals. The output of the first coincidence gate is fed to the input of the double range integrator where it is integrated twice. The first output of the double range integrator is proportional to altitude rate, while the second output of the double range integrator is proportional to altitude.

The time modulator produces a second output pulse which is called the track automatic gain control (TAGC) gate. The first, or track gate, output of the time modulator tracks the leading edge of the return video pulse, while the TAGC gate measures the peak of the return video pulse.

The output of the video amplifier is also fed to the first input of a second coincident gate. The TAGC gate is fed to a second input of the second coincident gate so that the video pulse is allowed to pass through to the input of a signal level detector. The output of the second coincident gate is detected in the signal level detector and is fed to a first input of an automatic gain control (AGC) integrator. The output of the AGC integrator is fed to the receiver IF strip and controls the gain of the IF strip so that the return video pulses have a constant magnitude. This is necessary since the track gate tracks the leading edge of the return video pulse, and this leading edge will vary if the amplitude of the video pulse varies, thereby giving an inaccurate altitude reading.

It is one object of this invention, therefore, to provide an improved time modulator for use in radar systems.

A further object of this invention is to provide a sawtooth generator wherein the slope of the sawtooth generated signal is varied as a function of a range, or altitude, signal.

Figure 2:
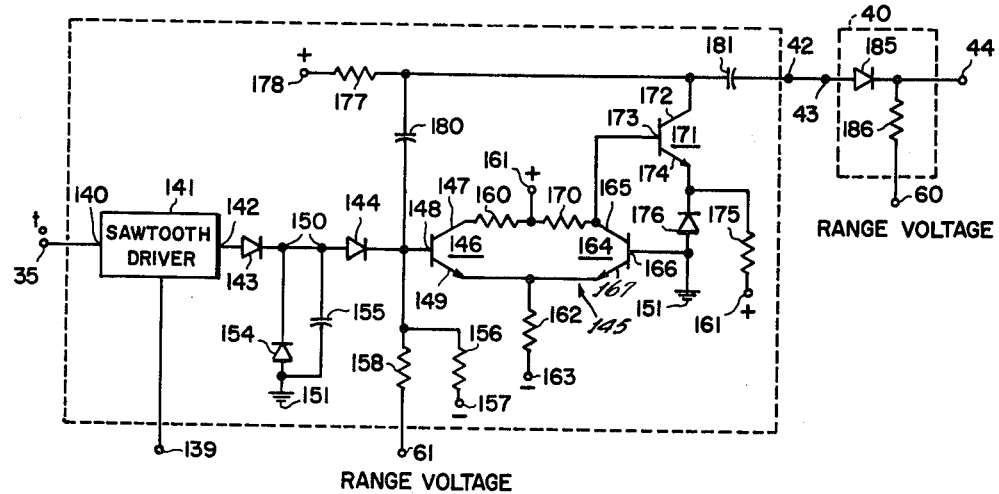
Figure 3:
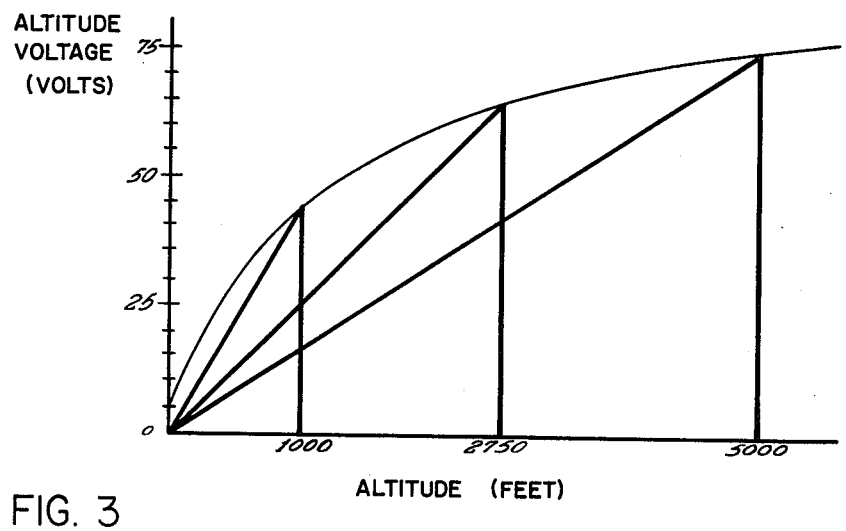

These and other objects of my invention will become apparent to those skilled in the art upon consideration of the accompanying specification, claims, and drawings of which:

FIGURE 1 is a block diagram of the altimeter system;
FIGURE 2 is a schematic representation of the sawtooth generator portion of the time modulator; and
FIGURE 3 illustrates the change in the slope of the sawtooth signal as a function of altitude voltage.

Referring to FIGURE 1 there is shown a transmitter-modulator unit 10 comprising a pulse modulator 11, a transmitter 12, and an antenna 13. An output 14 of pulse modulator 11 is connected to an input 15 of transmitter 12. An output 16 of transmitter 12 is connected to transmitter antenna 13. A receiver unit 17 comprises a receiver antenna 18, an RF filter 19, a balanced mixer 20, a local oscillator 21 and an IF amplifier and full wave detector 22.

Receiver antenna 18 is connected through RF filter 19 to an input 23 of the balanced mixer 20. The output of the local oscillator 21 is connected to a second input 24 of the balanced mixer 20. An output 25 of balanced mixer 20 is connected to an input 26 of the IF amplifier and full wave detector 22. An output 27 of the IF amplifier and the full wave detector 22 is connected to an input 30 of a video amplifier 31 in an altitude tracker 32.

A timing output 33 of transmitter 12 is connected by means of a conductor 34 to an input 35 of a sawtooth generator 36 of a time modulator 37. Time modulator 37 further includes a comparator 40 and a gate generator 41. An output 42 of sawtooth generator 36 is connected to a first input 43 of comparator 40, an output 44 of comparator 40 is connected to an input 45 of gate generator 41.

A first output 46 of gate generator 41 is connected to a first input 47 of a coincident gate 48. An output 49 of video amplifier 31 is connected to a second input 50 of coincident gate 48. An output 51 of coincident gate 48 is connected to an input 52 of a first integrator 53 of double integrator 54. Double integrator 54 further includes a second integrator 55. An output 56 of first integrator 53 is connected to an input 57 of second integrator 55. An output 58 of second integrator 55 is connected by means of a conductor 59 to a second input 60 of the comparator 40, and by means of conductor 59 and a conductor 59' to a second input 61 of sawtooth generator 36.

Output 58 of integrator 55 is further connected by means of a conductor 62 to an input 63 of a sensitivity control circuit 64. An output 65 of sensitivity control circuit 64 is connected to an input 66 of the IF amplifier 22 of receiver 17. Output 58 of integrator 55 is further connected by means of a contact 70 of a relay 71 to an input 72 of a smoother circuit 73. Relay 71 further has a relay winding 74 An output 75 of smoother circuit 73 is connected by means of a relay contact 76 of a relay 77 to an altitude output terminal 78. Relay 77 further has a relay winding 79.

A second output 80 of gate generator 41 is connected to an input 81 of a coincident gate and peak sensing detector 82. A second input 83 of coincident gate 82 is connected to output 49 of video amplifier 31. An output 84 of coincident gate 82 is connected to an input 85 of an AGC integrator 86. An output 87 of AGC integrator 86 is connected to an input 88 of the IF amplifier 22.

Output 84 of coincident gate 82 is coupled by means of a conductor 90 to an input 91 of a switching circuit 92 of the range sweep unit 93. Range sweep unit 93 further includes a recycle multivibrator 94 and a stop recycle circuit 95. A first output 97 of switching circuit 92 is connected by means of a conductor 98 to an inhibit input 99 of integrator circuit 53. An output 100 of switching circuit 92 is connected by means of a conductor 101 to the input 57 of integrator 55. An output 102 of switching circuit 92 is connected by means of a conductor 103 to relay winding 74 of relay 71. An output 109 of switching circuit 92 is connected by means of a conductor 110 to an input 114 of a delay circuit 115. The output of delay circuit 115 is connected to relay winding 79 of relay 77.

Output 58 of integrator 55 is connected by means of conductor 62 and a conductor 117 to an input 118 of recycle multivibrator 94, and by means of conductor 62 and a conductor 119 to an input 120 of stop recycle circuit 95. An output 121 of stop recycle circuit 95 is connected to an input 122 of recycle multivibrator 94. An output 124 of recycle multivibrator 94 is connected by means of a conductor 125 to the input 57 of integrator 55.

An output 141 of video amplifier 31 is connected to the input of a noise automatic gain control circuit 142, and an output 143 of noise AGC circuit 142 is connected to the input 85 of the AGC integrator 86.

*Operation of FIGURE 1*

The operation of the circuit of FIGURE 1 is as follows: pulse modulator 11 generates nanosecond pulse width pulses which are fed from the output 14 of pulse modulator 11 to the input 15 of the transmitter unit 12. The output of transmitter 12 is fed to the transmitter antenna 13 and an RF energy pulse is rediated toward the target, in this case, ground.

The reflected RF energy pulse is picked up by the receiver antenna 18 and is fed through RF filter 19 to the input 23 of the balanced mixer 20. The output of local oscillator 21 is fed to the input 24 of the balanced mixer 20. The ground return signal and the local oscillator signal are mixed in the balanced mixer and an IF frequency is generated at the output 25 of the balanced mixer. This IF frequency is coupled to the input 26 of the IF amplifier and full wave detector stage 22. The IF signal is then amplified and detected and a video signal appears at the output 27 of the IF amplifier and the full wave detector stage 22. This video signal is coupled to the video amplifier 31 where it is amplified. The output of video amplifier 31 is coupled to the noise automatic gain control circuit 142. The noise AGC circuit 142 senses the noise level on the video output line and develops an output signal at its output terminal 143 which is proportional to this noise level. The output of the noise AGC circuit 142 is coupled through the automatic gain control integrator 86 to the input 88 of the IF amplifier and full wave detector 22, and it is used to held the noise level on the video output to a prescribed level.

The amplified video signal appears at the output 49 of video amplifier 31 and is coupled to the input 50 of coincident gate 48 and to the input 83 of coincident gate and peak sensing detector 82.

Each time the transmitter 12 fires, a timing pulse appears at transmitter output terminal 33 and is coupled through conductor 34 to the input 35 of sawtooth generator 36. This timing pulse initiates the generation of a sawtooth signal which appears at the output 42 of sawtooth generator 36 and is coupled to the input 43 of comparator 40. The output appearing at terminal 58 of the double integrator 54 is coupled through conductor 59 to the input 60 of comparator 40, and through conductor 59 and conductor 59' to the input 61 of sawtooth generator 36. When the instantaneous magnitude of the sawtooth input to comparator 40 is equal to the magnitude of the output of double integrator 54, a signal will appear at output terminal 44 of comparator 40 and will be coupled to the input terminal 45 of gate generator 41. The output 58 of double integrator 54 is a signal which is proportional to altitude. As explained previously, this signal is coupled to the input 61 of sawtooth generator 36. The altitude signal at the input 61 of sawtooth generator 36 is used to vary the slope of the sawtooth output signal appearing at output 42 of sawtooth generator 36. This circuit will be explained more fully in the description of FIGURE 2.

The output signal from comparator 40 which is coupled to the input 45 of gate generator 41 causes a first and a second gate signal to appear at gate generator output terminals 46 and 80 respectively. The first gate output, called the track gate, is coupled from output terminal 46 of gate generator 41 to the input terminal 47 of coincident gate 48, while the second gate output, called the track automatic gain control (TAGC) gate appears at output terminal 80 of gate generator 41 and is coupled to the input terminal 81 of coincident gate and peak sensing detector 82. The trailing edge of the TAGC gate appearing at output terminal 80 of gate generator 41 is delayed in time by a predetermined amount with respect to the trailing edge of the track gate appearing at output terminal 46 of gate generator 41. The track gate input to terminal 47 of coincident gate 48 enables the coincident gate during the leading edge of the video pulse coupled to input 50 of coincident gate 48, and thereby allows an output signal proportional to the leading edge of the video signal to appear at terminal 51 of coincident gate 48. The output signal from gate 48 is coupled to the input 52 of integrator 53. This signal is integrated in integrator 53 and is coupled from the output 56 of integrator 53 to the input 57 of integrator 55. The signal at the output 56 of integrator 55 is proportional to the rate of change of altitude. As mentioned previously, this signal is coupled to the input 57 of integrator 55 where it is integrated. Since the input to integrator 55 is proportional to the rate of change of altitude of the output appearing at output 58 of integrator 55 will be proportional to altitude. This signal is coupled through relay contact 70 to the input terminal 72 of smoother circuit 73. This altitude signal is then smoothed in the smoother circuit and appears as a D.C. level at the output 75 of smoother circuit 73. This altitude signal is coupled through relay contact 76 to altitude output terminal 78.

As mentioned previously, the altitude signal appearing at output terminal 58 of integrator 55 is also coupled through conductor 59 to input terminal 60 of comparator 40. The magnitude of the altitude signal determines at what point an output will appear at the output of comparator 40 and hence the time at which gate generator 41 will generate the track gate and the TAGC gate.

The TAGC gate is fed to the input 81 of coincident gate and peak sensing detector 82, from the output 80 of gate generator 41, and enables gate 82. When gate 82 is enabled the video signal appearing at its input 83 is fed through the gate and an output appears at output terminal 84 which is proportional to the peak amplitude of the video signal.

The output signal at terminal 84 of coincident gate and peak sensing detector 82 is coupled to the input 85 of the AGC integrator 86. The signal is integrated in integrator 86 and is coupled from integrator output terminal 87 to the input terminal 88 of the IF amplifier on full wave detector circuit 22 and controls the gain of the IF amplifier so as to hold the magnitude of the video pulses constant.

The output at terminal 84 of coincident gate and peak sensing detector 82 is further coupled by means of conductor 90 to the input 91 of switching circuit 92 thereby operating switching circuit 92 to its first state. When switching circuit 92 is in its first state, an output appears at output terminal 102 and is coupled tthrough conductor 103 to relay winding 74 of relay 71 energizing the winding and thereby closing relay contact 70. Furthermore, an output appears at output terminal 109 of switching circuit 92 and is coupled through conductor 110 and delay circuit 115 to relay winding 79 of relay 77 thereby energizing windings 79 and closing relay contact 76. As explained previously, when relay contact 70 is closed the altitude output of the double integrator 54 is connected to the input of smoother circuit 73, and when relay contact 76 is closed the output of smoother 73 or in other words, the altitude signal, is connected to altitude output terminal 78.

Assume now that the track gate and the TAGC gate from the output of gate generator 41 lose track of the video pulse. In other words, assume that the track gate appearing at input 47 of coincident gate 48 is not coincident with the video pulse applied to input 50 of coincident gate 48, and similarly, the TAGC gate applied at input 81 of coincident gate and peak sensing detector 82 is not coincident with the video pulse applied to input 83 of gate 82. In this situation there will be no output from either coincident gate 48 or coincident gate and peak sensing detector 82 and hence it becomes necessary for the altimeter to switch over to a search mode so as to reestablish coincidence between the tracking gate and the video pulse.

This searching operation is accomplished as follows: when coincidence between the TAGC gate and the video pulse is lost, there will be no output from coincident gate and the peak sensing detector 82, and hence there will be no input signal at terminal 91 of switching circuit 92. Therefore, switching circuit 92 switches to its second operating state.

When switching circuit 92 is in its second operating condition, there is an output at output terminal 97 which is coupled through conductor 98 to an input 99 of integrator 53 thereby inhibiting integrator 53. At the same time that integrator 53 is inhibited a substantially step function signal appears at output terminal 100 of switching circuit 92 and is coupled through conductor 101 to the input 57 of integrator 55. This substantially step function input to integrator 55 is integrated and sweeps the output of integrator 55 to its positive limit. The output 58 of integrator 55 is coupled through conductor 62 and conductor 117 to the input 118 of recycle multivibrator 94. When the output of integrator 55 reaches its positive limit, recycle multivibrator 94 changes state and a substantially step function output appears at recycle multivibrator output 124. This signal is coupled through conductor 125 to the input 57 of integrator 55. This substantially step function signal is of an opposite polarity to the step function output of switching circuit 92, and hence this signal is integrated in integrator 55 and drives the output of integrator 55 to its negative limit. The output 58 of integrator 55 is connected by means of conductor 62 and conductor 119 to the input 120 of the stop recycle circuit 95. As the output of integrator 55 reaches its negative limit, a signal appears at output 121 of stop recycle circuit 95 and is coupled to input 122 of recycle multivibrator 94 threby resetting recycle mulivibrator 94. When recycle multivibrator 94 is reset the step input signal disappears from recycle multivibrator output 124 and the step function output from switch circuit 92 again controls the operation of integrator 55 and tends to drive the output of the integrator toward its positive limit once more.

As the output of double integrator 54 sweeps over its range from the positive limit to the negative limit, the point at which the instantaneous magnitude of the sawtooth wave form applied to input terminal 43 of comparator 40 will equal the magnitude of the output of the double integrator 54 applied to input 60 of comparator 40 will vary, and hence the time in which the output will appear an output terminal 44 of comparator 40 will also vary. Since the output of comparator 40 controls the time in which the gate generator 41 generates the track gate and the TAGC gate, the times of these gates will also vary and these gates will effectively be swept continuously up and back through substantially the limit of the altimeter range. At some point during their searching operation the track gate and the TAGC gate will intercept the video pulse from the output of video amplifier 31. At this time the track gate applied to terminal 47 of coincident gate 48 will be coincident with the video pulse applied to input terminal 50 of coincident gate 48, and hence an output will appear at output terminal 51. Similarly, the TAGC gate applied to terminal 81 of the coincident gate and peak sensing detector 82 will be coincident with the video pulse supplied to input terminal 83 and hence an output will once again appear at output terminal 84. As explained previously, the output on terminal 84 of coincident gate and peak sensing detector 82 will switch switching circuit 92 to the first mode of operation and the altimeter will return to the track mode.

When the altimeter changes from its track mode of operation to its search mode of operation, and switching circuit 92 changes from its first mode to its second mode of operation, the output at output terminal 102 of switching circuit 92, which energizes relay winding 74 of relay 71, is not immediately removed, but rather there is a short time delay before relay winding 74 is deenergized. The purpose of this short time delay is to prevent the smoother from being disconnected from the output of double integrator 54 in the event that there is a momentary loss of coincidence between the track gate and the TAGC gate and the video signal. Similarly, when switching circuit 92 changes from its first mode of operation to its second mode of operation and the output at output terminal 109 of switching circuit 92 disappears, delay circuit 115 prevents the immediate deenergization of relay winding 79 of relay 77. The delay of delay circuit 115 which inhibits the deenergization of relay winding 79 is substantially longer than the delay in switching circuit 92 that inhibits the deenergization of relay winding 74.

Smoother circuit 73 contains a memory, and hence this circuit will remember the aircraft's altitude at the moment that relay winding 74 is deenergized and relay contact 70 opens, thereby disconnecting smoother circuit 73 from the output of the double range integrator 54.

If the searching circuits of the altimeter are unable to reestablish coincidence between the video signal and the track gate and TAGC gate during the delay time of delay 115, then relay winding 79 will be deenergized and relay contact 76 will open, thereby removing the altitude signal from the altitude output terminal 78. At the same time that the altitude indicator drops to zero an indicator light will light; thereby indicating to the pilot of the aircraft that the altimeter is in the search mode. As soon as coincidence is reestablished between the video signal and the track gate and TAGC gate relay windings 74 and 79 will again be energized and the altitude indicator will indicate the present altitude.

Structure of FIGURE 2

FIGURE 2 shows a schematic representation of the sawtooth generator circuit 36 of FIGURE 1. Referring to FIGURE 2 there is shown input terminal 35 which is connected to an input 140 of a sawtooth driver 141. Sawtooth driver 141 further has an input 139 and an output 142. Output 142 is connected through a diode 143 in series with a diode 144 to a base electrode 148 of a transistor 146. Transistor 146 further has a collector 147 and an emitter 149. A junction 150 between diodes 143 and 144 is connected to ground by means of a reverse pole diode 154 in parallel with a capacitor 155. The base 148 of transistor 146 is connected by means of a resistor 156 to a source of negative potential 157, and by means of a resistor 158 to the range voltage input terminal 61.

Collector 147 of transistor 146 is connected by means of a resistor 160 to a positive potential source 161. The emitter 149 of transistor 146 is connected by means of a resistor 162 to a negative source of energizing potential 163, and is further directly connected to an emitter 167 of a transistor 164. Transistor 164 further has a collector 165 and a base 166. Base 166 of transistor 164 is connected directly to ground 151, while collector 165 is connected by means of a resistor 170 to the positive potential source 161. Transistors 146 and 164 and their associated circuitry form a differential amplifying stage 145. The collector 165 of transistor 164 is connected to a base 173 of a transistor 171. Transistor 171 further has a collector 172 and an emitter 174. Emitter 174 of transistor 171 is connected by means of a resistor 175 to the positive potential source 161, and by means of a zener diode 176 to ground 151. The collector 172 of transistor 171 is connected by means of a resistor 177 to a positive potential source 178. Collector 172 is further connected by means of a capacitor 180 to the base 148 of transistor 146, and by means of a capacitor 181 to the output terminal 42. The output 42 of sawtooth generator 46 is connected to the input 43 of comparator 40. Input terminal 43 of comparator 40 is connected through a diode 185 to output terminal 44 of comparator 40. Output terminal 44 is further connected by means of a resistor 186 to the range voltage input terminal 60.

Operation of FIGURE 2

In the quiescent operating state, that is, before the timing signal $T_o$ is applied to input terminal 35, the sawtooth driver 141 will produce a positive output signal at output 142. This positive output signal will be coupled through diode 143 and diode 144 to the base 148 of transistor 146 causing transistor 146 to conduct heavily. The conduction of transistor 146 from the positive potential source 161 through resistor 160, collector 147 to emitter 149 of transistor 146, and resistor 162 to the negative potential source 163 causes a volt drop across resistor 162 which applies a positive going voltage on the emitter 167 of transistor 164, thereby holding transistor 164 in an off or low conducting state. Since transistor 164 is in a low conducting state the potential at the collector 165 of transistor 164 will be positive and this positive potential is coupled to the base 173 of transistor 171 thereby causing transistor 171 to conduct heavily. Since transistor 171 is conducting heavily the potential on its collector 172 will be approximately equal to the voltage rating of zener diode 176 and capacitor 180 will be in a relatively discharged state.

Assume now that the timing signal $T_o$ is applied to input 35 and is coupled to the input 140 of sawtooth driver 141. This timing signal will cause sawtooth driver 141 to produce a negative output at its output terminal 142 which will back-bias diode 143. When diode 143 is back-biased, the base 148 of transistor 146 will move in a negative direction due to the operation of the negative potential source 157 through resistor 156. When the base 148 of transistor 146 moves in a negative direction the conduction of transistor 146 is decreased and transistor 146 will assume a low conducting or a cutoff state. When transistor 146 decreases in conduction, the volt drop across resistor 162 decreases and hence the bias on the emitter 167 of transistor 164 decreases and transistor 164 conducts more heavily. When transistor 164 conducts more heavily the voltage on its collector 165 moves in a negative direction and this negative going signal is coupled to the base 173 of transistor 171 thereby causing transistor 171 to decrease conduction or cut off. When transistor 171 cuts off or decreases conduction, the potential at its collector 172 goes positive to substantially the value of the positive potential source 178. Since capacitor 180 is substantially discharged the potential on the collector 172 of transistor 171 cannot change immediately but rather capacitor 180 begins to charge. The charging path of capacitor 180 is from the positive potential source 178 through resistor 177, capacitor 180, and resistor 156 to the negative potential source 157. As capacitor 180 charges, the potential on the collector 172 of transistor 171 increaes as a positive ramp function and this ramp signal is coupled through capacitor 181 to output terminal 42.

The positive range voltage at the output 58 of double integrator 54 (see FIGURE 1) is coupled to the input 60 of comparator 40 and from input 60 through resistor 186 to the cathode of diode 185 thereby back-biasing diode 185. The positive sawtooth signal at the output 42 of sawtooth generator 36 is coupled to the input 43 of comparator 40 and from input 43 to the anode of diode 185. As the magnitude of the positive sawtooth signal increases a point will be reached where the positive potential on the anode of diode 185 equals and exceeds the positive potential on the cathode of diode 185, and hence diode 185 will conduct and a positive output signal will appear at output 44. As explained in conjunction with FIGURE 1, this positive signal is coupled to gate generator 41 and activates gate generator 41 so that a track gate appears at output 46 and a TAGC gate appears at output 80.

The range voltage at output 58 of double integrator 54 is further coupled to the input 61 of sawtooth generator 36. This positive signal at input 61 causes a current flow through resistor 158 and resistor 156 to the negative potential source 157. The current flow through resistor 156 causes a volt drop across resistor 156 which subtracts from the charging voltage for the charging capacitor 180. As explained previously, the charging path of capacitor 180 is from the positive potential source 178 through resistor 177, capacitor 180, and resistor 156 to the negative potential source 157. As the range voltage at input 61 increases in a positive direction the volt drop across resistor 156 also increases in a positive direction and decreases the effective charging potential for capacitor 180, thereby decreasing the slope of the sawtooth signal appearing at the collector 172 of transistor 171. Therefore, it can be seen that as the range voltage at input 61 increases, due to an increase in altitude, the slope of the range sawtooth signal will decrease, while when the range voltage at input 61 is at a low value, corresponding to a low altitude, the slope of the range sawtooth will increase. Since the slope of the sawtooth signal varies as a function of the altitude signal the effective overall range of the altimeter is greatly increased and the necessity of utilizing additional range switching circuits is eliminated. The variation in the sawtooth slope as a function of altitude voltage is illustrated in FIGURE 3.

As explained previously in conjunction with FIGURE 1, the gate generator 41 produces output gates in response to an output signal from comparator 40. An additional output from gate generator 41 (not shown) is applied to input 139 of the sawtooth driver 141 thereby causing the sawtooth driver to revert to its quiescent state, that is, sawtooth driver 141 will produce a positive output at its output 142. When the output 142 of sawtooth driver 141 again goes positive, transistor 146 again conducts heavily and the output signal of the collector 165 of transistor 164 goes positive thereby causing transistor 171 to conduct and the potential on the collector 172 of transistor 171 to drop to a low positive value thereby causing capacitor 180 to discharge.

While we have explained a specific embodiment of our invention, it is to be understood that this is for the purpose of illustration only, and that our invention is to be limited solely by the scope of the appended claims.

We claim as our invention:

1. An altimeter comprising:
transmitting means for transmitting a radio frequency energy pulse to a reflecting object;
receiver means for receiving said energy pulse after said pulse has reflected from said object, said receiver including means for amplifying the reflected pulse and producing a video output pulse;
sawtooth generating means energized in synchronism with the output of said transmitter means and producing a substantially linear sawtooth output signal having a predetermined slope;
comparator means;
means connecting the sawtooth output of said sawtooth generating means to said comparator means;
double integrating means;
means connecting the output of said double integrating means to said comparator means;
means connecting the output of said double integrating means to said sawtooth generating means whereby the slope of the sawtooth output signal is made variable as a function of the output of said double integrating means;
gate generating means;
means connecting the output of said comparator means to said gate generating means;
coincident gate means;
means connecting said coincident gate means to the receiver video pulse output, said coincident gate means further having an enabling input;
means connecting the output of said gate generating means to said enabling input of said coincident gate means so as to enable said coincident gate means during the leading edge of the receiver video pulse output;
and means connecting the output of said coincident gate means to the input of said double integrating means.

2. A distance measuring device comprising:
sawtooth generating means responsive to a first signal and operable to produce a substantially linear sawtooth output signal having a predetermined slope;
comparator means;
means connecting the sawtooth output of said sawtooth generating means to said comparator means;
gate generating means operable to produce a gate output in response to an input signal;
means connecting the output of said comparator means as an input to said gate generating means;
coincident gate means connected so as to receive a second signal, said coincident gate means further having an enabling input;
means connecting the gate output of said gate generating means to the enabling input of said coincident gate means whereby said coincident gate means produces an output signal proportional to the leading edge of said second signal;
double integrating means connected to receive the output signal from said coincident gate means;
means connecting the output of said double integrating means to said comparator means to control the position of said gate output of said gate generating means whereby the gate is repositioned to follow any changes in the time between the occurrence of said first signal and said second signal;
and means connecting the output of said double integrating means to said sawtooth generating means whereby the slope of the sawtooth output signal is made variable as a function of the output of said double integrating means.

3. An altimeter comprising:
transmitting means for transmitting a radio frequency energy pulse to a reflecting object;
receiver means for receiving said energy pulse after said pulse has reflected from said object, said receiver producing a video output pulse;
sawtooth generating means energized in synchronism with the output of said transmitting means and producing a sawtooth output signal having a predetermined substantially linear slope;
comparator means;
means connecting the sawtooth output of said sawtooth generating means to said comparator means;
gate generating means operable to produce a gate output in response to an input signal;
means connecting the output of said comparator means as an input signal to said gate generating means;
coincident gate means connected to receive the video output pulse from said receiver means, said coincident gate means further having an enabling input;
means connecting the gate output of said gate generating means to the enabling input of said coincident gate means whereby said coincident gate means produces an output signal proportional to the leading edge of said video pulse;
means for integrating the output signal of said coincident gate means to produce an altitude signal;
means applying said altitude signal as an input to said comparator means;
and means applying said altitude signal as an input to said sawtooth generating means whereby the slope of the sawtooth output signal is made variable as a function of said altitude signal.

4. In an altimeter the apparatus comprising:
a high gain amplifier having an input and an output;
a capacitor connected between the output and input of said amplifier;
a charging path for said capacitor, said charging path including a source of charging potential and a charging resistor;
means for generating an altitude signal;
and means for applying said altitude signal to said charging path to vary the effective charging potential, and thus the charging rate of said capacitor as a function of altitude.

5. An altimeter comprising:
transmitting means for transmitting a radio frequency energy pulse to a reflecting object;
receiver means for receiving said energy pulse after said pulse has reflected from said object, said receiver producing a video output pulse;
sawtooth generating means generating a substantially linear ramp comprising in combination a high gain amplifier having an input and an output, a capacitor connected between the output and input of said amplifier, and a charging path for said capacitor said charging path including a source of charging potential;
means connected to said sawtooth generating means to energize said sawtooth generating means in synchronism with the output of said transmitting means, said sawtooth generating means producing a substantially linear sawtooth output signal having a predetermined slope;
comparator means;

means connecting the sawtooth output of said sawtooth generating means to said comparator means;

gate generating means operable to produce a gate output in response to an input signal;

means connecting the output of said comparator means as an input signal to said gate generating means;

coincident gate means connected to receive the video output pulse from said receiver means, said coincident gate means further having an enabling input;

means connecting the gate output of said gate generating means to the enabling input of said coincident gate means whereby said coincident gate means produces an output signal proportional to the leading edge of said video pulse;

means for integrating the output signal of said coincident gate means to produce an altitude signal;

means applying said altitude signal as an input to said comparator means;

and means applying said altitude signal to the charging path of said sawtooth generating means to vary the effective charging potential, and thus provide a sawtooth output signal with a variable slope that is a function of said altitude signal.

6. A distance measuring device comprising:

sawtooth generating means responsive to a first signal and operable to produce a substantially linear sawtooth output signal having a predetermined slope, said sawtooth generating means comprising in combination a high gain amplifier having an input and an output, capacitor connected between the output and input of said amplifier, and a charging path for said capacitor, said charging path including a source of charging potential;

comparator means;

means connecting the sawtooth output of said sawtooth generating means to said comparator means responsive to an input signal;

gate generating means operable to produce a gate output and means connecting the output of said comparator means as an input to said gate generating means;

coincident gate means connected so as to receive a second signal, said coincident gate means further having an enabling input;

means connecting the gate output of said gate generating means to the enabling input of said coincident gate means whereby said coincident gate means produces an output signal proportional to the leading edge of said second signal;

double integrating means connected to receive the output signal from said coincident gate means;

means connecting the output of said double integrating means to said comparator means to control the position of said gate output of said gate generating means whereby the gate is repositioned to follow any changes in the time between the occurrence of said first signal and said second signal;

and means connecting the output of said double integrating means to the charging path of said sawtooth generating means to provide a sawtooth output signal having a variable slope that is a function of the output of said double integrating means.

References Cited by the Examiner

UNITED STATES PATENTS

| | | | |
|---|---|---|---|
| 2,466,539 | 4/1949 | Evans | 343—13 |
| 2,727,209 | 12/1955 | Mayer | 343—7.3 |
| 3,013,260 | 12/1961 | Schwalbe | 343—13 |

CHESTER L. JUSTUS, *Primary Examiner.*